US009871898B2

(12) United States Patent
Kwong

(10) Patent No.: US 9,871,898 B2
(45) Date of Patent: Jan. 16, 2018

(54) CERAMIC COVER FOR ELECTRONIC DEVICE HOUSING

(71) Applicant: Apple Inc., Cupertino, CA (US)

(72) Inventor: Kelvin Kwong, San Jose, CA (US)

(73) Assignee: APPLE INC., Cupertino, CA (US)

( * ) Notice: Subject to any disclaimer, the term of this patent is extended or adjusted under 35 U.S.C. 154(b) by 307 days.

(21) Appl. No.: 13/890,141

(22) Filed: May 8, 2013

(65) Prior Publication Data

US 2014/0334077 A1    Nov. 13, 2014

(51) Int. Cl.
| H05K 5/00 | (2006.01) |
| H05K 7/00 | (2006.01) |
| H04M 1/02 | (2006.01) |
| G06F 1/16 | (2006.01) |
| H04M 1/18 | (2006.01) |

(52) U.S. Cl.
CPC ........ *H04M 1/0249* (2013.01); *G06F 1/1626* (2013.01); *G06F 1/1656* (2013.01); *H04M 1/185* (2013.01); *Y10T 29/49002* (2015.01)

(58) Field of Classification Search
CPC .... G06F 1/1637; G06F 1/1601; G06F 1/1679; G06F 1/181; G06F 2200/1634; H04M 1/0266; H04M 1/0249; H04M 1/185; H04M 1/0252; H04M 1/026; H05K 5/0017; H05K 5/03; H05K 7/00; H05K 5/0091; H05K 5/04; G02F 1/133308; G02F 2001/133317; G02F 2201/503; G02F 1/133608; G02F 2001/133328; G02F 2001/133331; G02F 2201/50; B29C 70/68; G04G 17/08; G04R 60/12

USPC ........ 174/50, 520, 521, 559, 560, 561, 563; 361/679.01, 679.21, 679.3, 732; 349/58; 368/276, 286, 287, 291, 295, 316, 317
See application file for complete search history.

(56) References Cited

U.S. PATENT DOCUMENTS

| D118,749 S | 1/1940 | Zimmerman |
| D124,596 S | 1/1941 | Arenberg |
| 2,269,554 A | 1/1942 | Rolph |
| 4,403,224 A | 9/1983 | Wirnowski |

(Continued)

FOREIGN PATENT DOCUMENTS

| CN | 101379459 A | 3/2009 |
| CN | 101722635 A | 6/2010 |

(Continued)

OTHER PUBLICATIONS

Lu, "Liquid Optically Clear Adhesives for display Applications", Henkeina.com, Apr. 1, 2001, pp. 1-4.

(Continued)

*Primary Examiner* — James Wu
(74) *Attorney, Agent, or Firm* — Brownstein Hyatt Farber Schreck, LLP

(57) ABSTRACT

An electronic device having an enclosure formed from at least one ceramic cover and a peripheral structure adjacent the periphery of the ceramic cover is disclosed. The peripheral structure can be secured adjacent to the ceramic cover with an attachment member. The ceramic cover can include a recess to receive the attachment member. The peripheral structure can be molded adjacent the ceramic cover so that a gapless interface can be formed between the peripheral structure and the periphery of the ceramic cover.

28 Claims, 7 Drawing Sheets

(56) References Cited

U.S. PATENT DOCUMENTS

| | | | |
|---|---|---|---|
| 4,522,508 A * | 6/1985 | Meister | 368/276 |
| 4,561,783 A * | 12/1985 | Lederrey | G04B 37/0008 368/291 |
| 4,995,941 A | 2/1991 | Nelson et al. | |
| 5,036,502 A * | 7/1991 | Grosjean | G04B 37/226 368/282 |
| 5,394,306 A | 2/1995 | Koenck et al. | |
| 5,456,955 A | 10/1995 | Muggli | |
| 5,514,319 A | 5/1996 | Young | |
| 5,613,237 A | 3/1997 | Bent et al. | |
| 5,681,515 A | 10/1997 | Pratt et al. | |
| 5,867,149 A | 2/1999 | Jaeger | |
| 5,932,329 A | 8/1999 | Frost et al. | |
| 6,058,293 A | 5/2000 | Phillips | |
| 6,206,563 B1 * | 3/2001 | Dombre et al. | 368/294 |
| 6,229,993 B1 | 5/2001 | Greenway et al. | |
| 6,266,685 B1 | 7/2001 | Danielson et al. | |
| 6,323,846 B1 | 11/2001 | Westerman et al. | |
| 6,340,252 B1 | 1/2002 | Kawano | |
| 6,462,890 B2 | 10/2002 | Hsu | |
| 6,510,226 B1 | 1/2003 | Thomann et al. | |
| 6,532,152 B1 | 3/2003 | White et al. | |
| 6,777,621 B2 | 8/2004 | Ishikawa et al. | |
| 6,796,708 B2 | 9/2004 | Kawamata et al. | |
| 6,825,751 B1 * | 11/2004 | Kita et al. | 340/5.61 |
| 6,842,288 B1 | 1/2005 | Liu et al. | |
| 6,876,543 B2 | 4/2005 | Mockridge et al. | |
| 6,965,789 B2 | 11/2005 | Hauge et al. | |
| 6,980,095 B2 | 12/2005 | Wright et al. | |
| 7,031,148 B1 | 4/2006 | Lin | |
| 7,046,230 B2 | 5/2006 | Zadesky et al. | |
| 7,073,916 B2 | 7/2006 | Yin et al. | |
| 7,113,237 B2 | 9/2006 | Nitto et al. | |
| 7,236,588 B2 | 6/2007 | Gartrell | |
| 7,595,983 B2 | 9/2009 | Okuda | |
| D606,539 S | 12/2009 | Liao et al. | |
| 7,636,244 B2 | 12/2009 | Kriege et al. | |
| 7,697,269 B2 | 4/2010 | Yang et al. | |
| 7,697,281 B2 | 4/2010 | Dabov et al. | |
| 7,711,256 B2 | 5/2010 | Wun | |
| 7,872,861 B2 | 1/2011 | Ou et al. | |
| 7,933,123 B2 | 4/2011 | Wang et al. | |
| 8,004,835 B2 | 8/2011 | Conti et al. | |
| 8,023,261 B2 | 9/2011 | Sanford | |
| 8,238,087 B2 | 8/2012 | McClure et al. | |
| 8,254,098 B2 | 8/2012 | Liu et al. | |
| 8,320,978 B2 | 11/2012 | Chang et al. | |
| 8,797,721 B2 | 8/2014 | Pakula et al. | |
| 9,185,816 B2 | 11/2015 | Pakula et al. | |
| 9,235,240 B2 | 1/2016 | Pakula et al. | |
| 2002/0172017 A1 | 11/2002 | Tarnowski | |
| 2002/0173145 A1 | 11/2002 | Honda | |
| 2003/0006128 A1 | 1/2003 | Giles et al. | |
| 2003/0045246 A1 | 3/2003 | Lee et al. | |
| 2003/0108720 A1 | 6/2003 | Kashino | |
| 2003/0164905 A1 | 9/2003 | Yamaoka et al. | |
| 2003/0184894 A1 | 10/2003 | Bischof et al. | |
| 2004/0022017 A1 | 2/2004 | Chuang | |
| 2004/0042168 A1 | 3/2004 | Yang et al. | |
| 2004/0079457 A1 | 4/2004 | Kimura et al. | |
| 2005/0020174 A1 | 1/2005 | Makifuchi | |
| 2005/0030707 A1 | 2/2005 | Richardson | |
| 2005/0052425 A1 | 3/2005 | Zadesky et al. | |
| 2005/0062902 A1 | 3/2005 | Fukayama | |
| 2005/0083308 A1 | 4/2005 | Homer et al. | |
| 2005/0286214 A1 | 12/2005 | Chen | |
| 2006/0055839 A1 | 3/2006 | Hirao et al. | |
| 2006/0132644 A1 | 6/2006 | Shangguan et al. | |
| 2006/0158539 A1 | 7/2006 | Deluga | |
| 2006/0197750 A1 | 9/2006 | Kerr et al. | |
| 2006/0239746 A1 | 10/2006 | Grant | |
| 2006/0268528 A1 | 11/2006 | Zadesky et al. | |
| 2007/0025072 A1 | 2/2007 | Liao | |
| 2007/0052679 A1 | 3/2007 | Liang | |
| 2007/0173299 A1 | 7/2007 | Sawayama et al. | |
| 2007/0241434 A1 | 10/2007 | Inada | |
| 2008/0062660 A1 | 3/2008 | Weber et al. | |
| 2008/0092809 A1 | 4/2008 | Lin et al. | |
| 2008/0131683 A1 | 6/2008 | Ristic-Lehmann et al. | |
| 2008/0146293 A1 | 6/2008 | Kim et al. | |
| 2008/0166009 A1 | 7/2008 | Dinh et al. | |
| 2008/0186555 A1 | 8/2008 | Nakatsu | |
| 2008/0206492 A1 | 8/2008 | Husemann et al. | |
| 2008/0239647 A1 | 10/2008 | Luo et al. | |
| 2008/0264548 A1 | 10/2008 | Zhang | |
| 2008/0266766 A1 | 10/2008 | D'Urso et al. | |
| 2008/0284819 A1 | 11/2008 | Owaki | |
| 2008/0316117 A1 | 12/2008 | Hill et al. | |
| 2009/0046072 A1 | 2/2009 | Emig et al. | |
| 2009/0046240 A1 | 2/2009 | Bolton | |
| 2009/0054115 A1 | 2/2009 | Horrdin et al. | |
| 2009/0059485 A1 | 3/2009 | Lynch et al. | |
| 2009/0059502 A1 | 3/2009 | Filson et al. | |
| 2009/0065136 A1 | 3/2009 | Nadella et al. | |
| 2009/0067141 A1 | 3/2009 | Dabov et al. | |
| 2009/0093575 A1 | 4/2009 | Kabashima et al. | |
| 2009/0183819 A1 | 7/2009 | Matsuhira | |
| 2009/0245564 A1 | 10/2009 | Mittleman et al. | |
| 2009/0257189 A1 | 10/2009 | Wang et al. | |
| 2009/0257207 A1 | 10/2009 | Wang et al. | |
| 2009/0264160 A1 | 10/2009 | Mochizuki et al. | |
| 2009/0296325 A1 | 12/2009 | Morimoto et al. | |
| 2010/0060563 A1 | 3/2010 | Hayton et al. | |
| 2010/0061040 A1 | 3/2010 | Dabov et al. | |
| 2010/0061044 A1 | 3/2010 | Zou et al. | |
| 2010/0089729 A1 | 4/2010 | Li et al. | |
| 2010/0091442 A1 | 4/2010 | Theobald et al. | |
| 2010/0120480 A1 | 5/2010 | Jung | |
| 2010/0149410 A1 | 6/2010 | Matsuzawa | |
| 2010/0178047 A1 | 7/2010 | Nitanda | |
| 2010/0203924 A1 | 8/2010 | Hirota | |
| 2010/0269891 A1 * | 10/2010 | Kinard et al. | 136/251 |
| 2010/0283394 A1 | 11/2010 | Ong | |
| 2010/0285260 A1 * | 11/2010 | Bookbinder | B32B 3/02 428/45 |
| 2010/0309369 A1 | 12/2010 | Jarvis | |
| 2010/0315570 A1 | 12/2010 | Mathew et al. | |
| 2011/0050053 A1 | 3/2011 | Deng | |
| 2011/0050054 A1 | 3/2011 | Chang et al. | |
| 2011/0086676 A1 | 4/2011 | Choi et al. | |
| 2011/0096483 A1 | 4/2011 | Sapper et al. | |
| 2011/0136553 A1 | 6/2011 | Jo | |
| 2011/0164365 A1 | 7/2011 | McClure et al. | |
| 2011/0165361 A1 | 7/2011 | Sherman et al. | |
| 2011/0186345 A1 | 8/2011 | Pakula et al. | |
| 2011/0187245 A1 | 8/2011 | Pakula et al. | |
| 2011/0188180 A1 | 8/2011 | Pakula et al. | |
| 2011/0215685 A1 | 9/2011 | Jarvis et al. | |
| 2011/0255227 A1 | 10/2011 | Murakami | |
| 2011/0315579 A1 | 12/2011 | Mase | |
| 2012/0113611 A1 | 5/2012 | Maniar et al. | |
| 2012/0118628 A1 | 5/2012 | Pakula et al. | |
| 2012/0170284 A1 | 7/2012 | Shedletsky | |
| 2012/0275088 A1 | 11/2012 | Huang | |
| 2016/0054537 A1 | 2/2016 | Pakula et al. | |
| 2016/0062398 A1 | 3/2016 | Pakula et al. | |

FOREIGN PATENT DOCUMENTS

| | | |
|---|---|---|
| CN | 101518168 A | 12/2011 |
| CN | 101458408 A | 1/2012 |
| EP | 0458016 A1 | 11/1991 |
| EP | 2154596 | 2/2010 |
| JP | 6-94848 | 4/2004 |
| JP | A 2006-276623 | 10/2006 |
| JP | A 2008-518807 | 6/2008 |
| JP | A 2009/259908 | 11/2009 |
| JP | A 2010-091742 | 4/2010 |
| WO | WO 2008/035736 | 3/2008 |
| WO | 2009/024842 A1 | 2/2009 |
| WO | 2009/126480 A2 | 10/2009 |
| WO | 2010/033571 | 3/2010 |
| WO | WO 2010/074144 | 7/2010 |
| WO | 2010/101961 | 9/2010 |

(56) References Cited

FOREIGN PATENT DOCUMENTS

OTHER PUBLICATIONS

Henkel, "Loctite Liquid Optically Clear Adhesives", Henkeina. com, downloaded Mar. 18, 2013, pp. 1-2.

* cited by examiner

CERAMIC COVER FOR ELECTRONIC DEVICE HOUSING

BACKGROUND

Portable electronic devices, particularly those that provide wireless data connectivity, are finding increasing popularity. Because of the usefulness of such devices to inform and entertain, their owners may desire to take them wherever they go. While small size may be desired for portability, ruggedness may also be desired along with small size.

The foregoing may present design challenges. Smaller and smaller devices made of conventional materials and assembled using conventional techniques may become more fragile. On the other hand, devices built to maximize ruggedness may be too bulky and unattractive to consumers.

Unfortunately, however, as portable electronic device continue to be made smaller, thinner and/or more powerful, there remains a continuing need to provide improved structures for portable electronic device housings.

SUMMARY

The invention pertains to an electronic device having an enclosure formed from at least one ceramic cover and a peripheral structure. The peripheral structure can be provided adjacent the periphery of the ceramic cover. The peripheral structure can be secured adjacent to the ceramic cover with an attachment member. The ceramic cover can include a recess to receive the attachment member. The peripheral structure can be molded adjacent the ceramic cover so that a gapless interface can be formed between the peripheral structure and the periphery of the ceramic cover. The enclosure for the electronic device can be thin yet be sufficiently strong to be suitable for use in electronic devices, such as portable electronic devices.

The invention can be implemented in numerous ways, including as a method, system, device, or apparatus. Several embodiments of the invention are discussed below.

As an electronic device enclosure, one embodiment can, for example, include at least a ceramic cover for an exposed outer surface for the electronic device enclosure, the ceramic cover having a peripheral portion; an attachment member coupled with the peripheral portion of the ceramic cover; and a peripheral structure configured to provide a support surface for the ceramic cover and to provide side protective surfaces for the ceramic cover. The peripheral structure can be at least partially secured to the ceramic cover by the attachment member.

As a consumer electronic device, one embodiment can, for example, include at least a ceramic cover for an exposed outer surface for the consumer electronic device; a peripheral structure configured to provide a support surface for the ceramic cover and to provide side protective surfaces for the ceramic cover, the peripheral structure being at least partially secured to the ceramic cover by a mechanical interlock; and electrical components including at least a controller, a memory, and a display, the display being provided at or adjacent the ceramic cover.

As a method for assembling an electronic device, one embodiment of the method can, for example, include at least: obtaining a ceramic member having a top surface and a bottom surface, the top surface providing an outer surface at least a portion of the electronic device; aligning the ceramic member relative to a support structure for the electronic device; and molding a peripheral protective side portion for the electronic device, the peripheral protective side portion being molded adjacent the periphery of the ceramic member and adjacent the support structure.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Figure 1A:
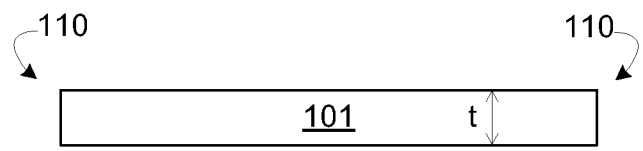
FIG. 1A is a cross-sectional view of a ceramic cover for an electronic device housing according to one embodiment.

Embodiments are described herein in the context of a housing for an electronic device. The housing can make use of an outer member, which can be formed of ceramic. The outer member can be aligned, protected and/or secured with respect to other portions of the housing for the electronic device. The electronic device can be portable and in some cases handheld.

According to one aspect, an electronic device housing (or enclosure) can be formed from at least one ceramic cover and a peripheral structure formed adjacent the periphery of the ceramic cover. The peripheral structure can be secured adjacent to the ceramic cover with an attachment member. The ceramic cover can include a recess to receive the attachment member. The peripheral structure can be molded adjacent the ceramic cover so that a gapless interface is formed between the peripheral structure and the periphery of the ceramic cover.

The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts. It should be appreciated that the drawings are generally not drawn to scale, and at least some features of the drawings have been exaggerated for ease of illustration.

In the interest of clarity, not all of the routine features of the implementations described herein are shown and described. It will, of course, be appreciated that in the development of any such actual implementation, numerous implementation-specific decisions must be made in order to achieve the specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of the invention can relate to apparatus, systems and methods for forming a housing having a thin ceramic member for an electronic device housing. In one example, the ceramic member may be an outer surface of an electronic device housing. The ceramic member may, for example, correspond to a ceramic cover provided at a display area of an electronic device (i.e., situated in front of a display either as a separate part or integrated within the display). Alternatively or additionally, the ceramic member may form a part of the electronic device housing. For example, it may form an outer surface other than for or over the display area.

As discussed with reference to the figures, various embodiments may employ a ceramic cover for a top surface of an electronic device enclosure or housing. The ceramic cover may be substantially transparent, and may provide a ceramic cover window, so that a display of electronic device may be viewable through the ceramic cover window. The ceramic cover may have an at least partly crystalline structure. In some embodiment, the ceramic cover may have a substantially crystalline structure. In some embodiment, a majority of the ceramic cover may have a crystalline structure.

The ceramic cover may comprise a relatively hard ceramic such as sapphire or zirconia. Indeed, the ceramic cover may be substantially harder than commercial glasses used in mobile telephones. For example, the ceramic cover may have a Vickers hardness that is substantially greater than approximately seven hundred kg/mm$^2$ (kilograms per square millimeter). The ceramic cover 101 may have a Vickers hardness of approximately two thousand kg/mm$^2$ or more. The hardness of the ceramic cover may provide advantages in scratch resistance and/or breakage resistance in electronic device enclosures or housings.

In addition to being relatively hard, the ceramic cover of the electronic device enclosures or housings as discussed herein may also be relatively strong, while also being made relatively thin. Since thinness in electronic device enclosures or housings may be desirable, it may likewise be desirable for the ceramic cover to be thin. For example, thickness of the ceramic cover may have a thickness of about 0.3-1.0 millimeter.

Accordingly, it should be understood that the apparatus, systems and methods for improving strength of thin ceramic are especially suitable for ceramic covers, or displays (e.g., LCD displays), assembled in small form factor electronic devices such as handheld electronic devices (e.g., mobile phones, media players, personal digital assistants, remote controls, etc.). The ceramic can be thin in these small form factor embodiments, such as less than 3 mm, or more particularly between 0.5 and 2.5 mm, or even more particularly between 0.3 and 1.0 mm. The apparatus, systems and methods can also be used for ceramic covers or displays for other devices including, but not limited to including, relatively larger form factor electronic devices (e.g., portable computers, tablet computers, displays, monitors, televisions, etc.). The ceramic can also be thin in these larger form factor embodiments, such as less than 5 mm, or more particularly between 0.5 and 3 mm, or even more particularly between 0.3 and 2.0 mm.

In addition to being relatively hard, strong and thin, the ceramic cover may be securely fastened to a peripheral structure of the electronic device enclosure or housing. This may be desirable if the electronic device is accidentally dropped, so that detachment of the ceramic cover from the peripheral structure of the electronic device may be avoided. While adhesives may be used for attachment, there may be the following advantages to using an attachment member, such as a tenon, of the peripheral structure disposed in a laser ablated recess that extends into the ceramic cover. The attachment member may serve to fasten the ceramic cover to the peripheral structure of the electronic device housing more securely than adhesives. Further, use of an adhesive layer to fasten the ceramic cover may add an undesired thickness, which may be substantially avoided by using the attachment member as discussed herein.

Additionally, since the strength and hardness of the ceramic cover may create difficulties in machining one or more recesses quickly and easily, such difficulties may be substantially avoided by using laser ablation. In particular, a high power pico second or femto second laser may be used for ablating ceramic cover, which could be formed of sapphire or zirconia. Suitable lasers are available from Manz AG, having a place of business at Steigaeckerstrasse 572768 in Reutlingen, Germany.

Embodiments are discussed below with reference to FIGS. 1A-8. However, those skilled in the art will readily appreciate that the detailed description given herein with respect to these figures is for explanatory purposes as the invention extends beyond these limited embodiments.

FIG. 1A is a cross-sectional view of a ceramic cover 101 for an electronic device housing according to one embodiment. As shown, the ceramic cover 101 may have a thickness "t" of about 0.3-1.0 millimeter. As shown in FIGS. 1A-1D, the ceramic cover 101 has a peripheral portion 110.

Figure 1B:
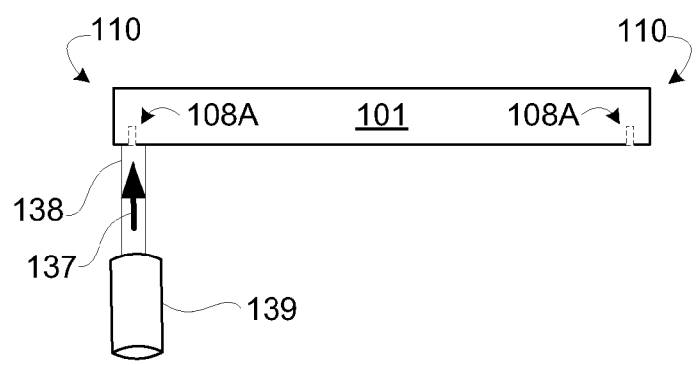
FIG. 1B is a cross-sectional view showing a recess extending into a ceramic cover for the electronic device housing according to one embodiment.

FIG. 1B is a cross-sectional view of the ceramic cover 101 according to one embodiment. In this embodiment, the ceramic cover 101 includes one or more recesses 108A extending into the ceramic cover 101 for the electronic device housing. As shown, the ceramic cover 101 may have one or more laser ablated recesses 108A extending into the peripheral portion 110 of the ceramic cover 101. To form the one or more laser ablated recesses 108A, a fluid jet 138 such as a jet of water 138 may be directed to contact the peripheral portion of the ceramic cover 101. A laser beam 137 from a laser 139 may be directed within the fluid jet to contact the ceramic cover 101. The laser beam 137 may laser ablate the recess 108A which extends into the ceramic cover 101. The fluid jet 138 may help to speed ablation and make the ablation more productive, and may also cool and carry away ablated ceramic from the recess 108A. Otherwise, without the fluid jet 138, hot ablated ceramic may re-deposit within the recess 108A, which may slow ablation and/or may make ablation less productive.

FIG. 10 is a cross-sectional view of an electronic device housing 100 (or electronic device enclosure) according to one embodiment. The electronic device housing 100 may include an outer housing member 101, which may comprise the ceramic cover 101, supported and protected by a protective side member 102, which may comprise a peripheral structure 102. The protective side member 102 may be positioned tightly adjacent sides of the outer housing member 101. The protective side members 102 can provide a thin layer of material positioned tightly adjacent sides of the outer housing member 101, thereby buffering impact at the sides of the outer housing member 101. The protective side member 102 may also support the outer housing member 101 and may serve to secure the outer housing member 101 to other portions of the electronic device housing 100. In one embodiment, the protective side member 102 extends around all sides of the outer housing member 101. In another embodiment, the protective side member 102 extends around those of the sides of the outer housing member 101 that would otherwise be exposed.

Accordingly, it should be understood that the ceramic cover 101, or more generally the outer housing member 101, may provide a top surface for the electronic device enclosure 100. The peripheral structure 102 may provide a support surface for the ceramic cover 101 and may provide side protective surfaces for the ceramic cover 101.

As shown in FIG. 10, outer housing member 101 can be secured to a support structure 104 of the electronic device housing 100. The support structure 104 can, for example, be an outer periphery member for the electronic device housing 100. In one embodiment, the support structure 104 can couple to another outer housing member 106, which can be formed same or differently than the outer housing member 101.

An attachment member 108 may be coupled with the peripheral portion 110 of the ceramic cover 101. The ceramic cover 101 may be at least partially secured to peripheral structure 102 the by the attachment member 108. The attachment member 108B may comprise a tenon that extends into the recess 108A of the peripheral portion 110 of the ceramic cover 101. The recess 108A may be configured to interlock mechanically with the attachment member 108B, so as to secure the peripheral portion 110 of the ceramic cover 101 to the peripheral structure 102.

Figure 1C:
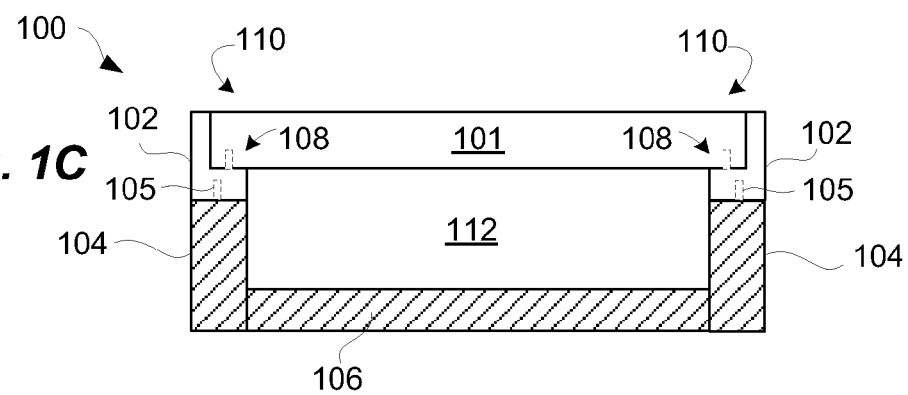
FIG. 1C is a cross-sectional view of an electronic device housing according to one embodiment.

The attachment member 108B (e.g., tenon) may be made integral with a portion of the peripheral structure 102. The attachment member 108B may be molded adjacent the peripheral portion 110 of the ceramic cover 101. More particularly, the attachment member 108B may be molded into the recess 108A of the peripheral portion 110 of the ceramic cover 101. As shown in FIG. 1C, molding of the peripheral structure 102 to the peripheral portion 110 of the ceramic cover 101 may provide a substantially gap-free interface between the peripheral structure 102 and edges of the peripheral portion 110 of the ceramic cover 101.

In other words, the protective side member 102 can be secured tightly adjacent the sides of the outer housing member 101 using at least the attachment member 108B. The protective side member 102 can also be molded in place so as to be tightly adjacent the sides of the outer housing member 101. By molding the protective side member 102 in place, the outer exposed interface 110 between the sides (e.g., edges) of the outer housing member 101 and the peripheral side member 102 may be essentially gap-free. An internal space 112 is provided internal to the electronic device housing 100 whereby various electrical components can be attached, affixed or placed so as to provide electronic operations for the electronic device.

In order to facilitate molding, the peripheral structure 102 may comprise a polymer. Further, the peripheral structure 102 may comprise a polymer strengthened by containing ceramic fibers. The polymer of the peripheral structure 102 may include additives such that coefficient of thermal expansion of the peripheral structure may be made closer to coefficient of thermal expansion of the ceramic cover 101. The additives may comprise particles or fibers made of ceramic material.

The electronic device enclosure 100 may further comprise a support structure 104, which may be a metal support structure 104. As shown in FIG. 1C, the peripheral structure 102 may be formed adjacent to the support structure 104. The support structure 104 may have at least one feature 105 that may provide a mechanical interlock with the peripheral structure 102 after the peripheral structure 102 has been molded.

Accordingly, it should be understood that the various members, parts or assemblies of the electronic device housing 100 can be formed of a variety of materials. In one embodiment, while the outer housing member 101 may be ceramic, the protective side member 102 may be formed from polymer (e.g., thermoplastic), the support structure 104 may be formed from metal or polymer (e.g., plastic), and the another outer housing member 106 may be formed from ceramic, glass, polymer (e.g., plastic) or metal. More particularly, in some embodiments, the protective side member 102 can be a structurally strengthened polymer (e.g., thermoplastic). As an example, the protective side member 102 can be polymer, such as polyarylamide, nylon or polycarbonate, which can be structurally strengthened by including ceramic or glass fibers. For example, some examples of some structurally strengthened polymers include 50% ceramic or glass filled nylon and 30% ceramic or glass filled polycarbonate.

Figure 1D:
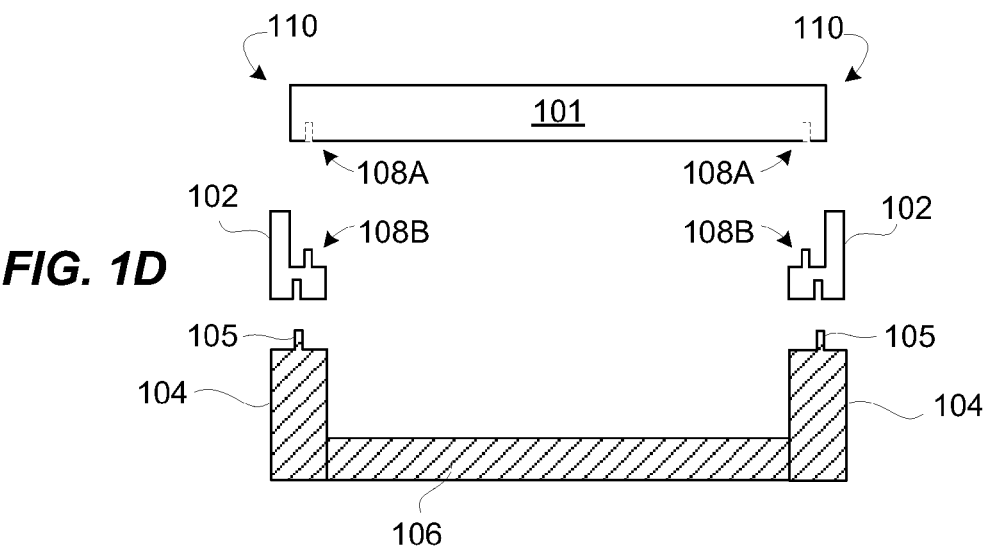
FIG. 1D is a cross-sectional assembly diagram for the electronic device housing shown in FIG. 1C, according to one embodiment.

FIG. 1D is a cross-sectional assembly diagram for the electronic device housing 100 shown in FIG. 1C, according to one embodiment. The outer housing member 101, which may comprise ceramic cover 101, may have an outer surface and an inner surface. The inner surface of the ceramic cover 101 may be coupled with the peripheral structure 102. More specifically, the peripheral portion 110 of the ceramic cover 101 may be coupled with the peripheral structure 102 via the attachment member 108B. The attachment member 108B may comprise a tenon for extending into the recess 108A of the peripheral portion 110 of the ceramic cover 101, as shown in FIG. 1D. The recess 108A may be configured to interlock mechanically with the attachment member 108B, so as to secure the peripheral portion 110 of the ceramic cover 101 to the peripheral structure 102.

As shown in FIG. 1D, the attachment member 108B may be made integral with a portion of the peripheral structure 102. The attachment member 108B may be molded to the peripheral portion 110 of the ceramic cover 101. More particularly, the attachment member 108B, which may include at least one tenon, may be molded into the recess 108A of the peripheral portion 110 of the ceramic cover 101.

The protective side member 102 can be molded adjacent the sides of the outer housing member 101. When the protective side member 102 is molded, the protective side member 102 can also be at least partially formed with the attachment member 108B within the recess 108A at the bottom surface of the outer housing member 101. Moreover, when the protective side member 102 is formed, the protective side member 102 can also be adjacent and secured to an upper side portion of the support structure 104. When the protective side member 102 is provided at the sides (i.e., edges) of the outer housing member 101, the protective side member 102 can provide a buffer layer (e.g., bumper), which may dampen impact induced at the sides of the outer housing member 101 of the electronic device housing 100.

Figure 2A:
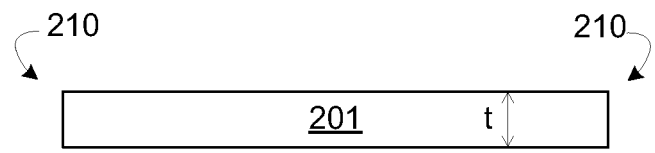
FIG. 2A is a cross-sectional view of a ceramic cover for an electronic device housing according to one embodiment.

For purposes of further illustration, FIG. 2A shows a cross-sectional view of a ceramic cover 201 for an electronic device housing according to one embodiment. As shown, the ceramic cover 201 may have a thickness "t" of about 0.3-1.0 millimeter. As shown in FIGS. 2A-2D, the ceramic cover 201 may have a peripheral portion 210.

Figure 2B:
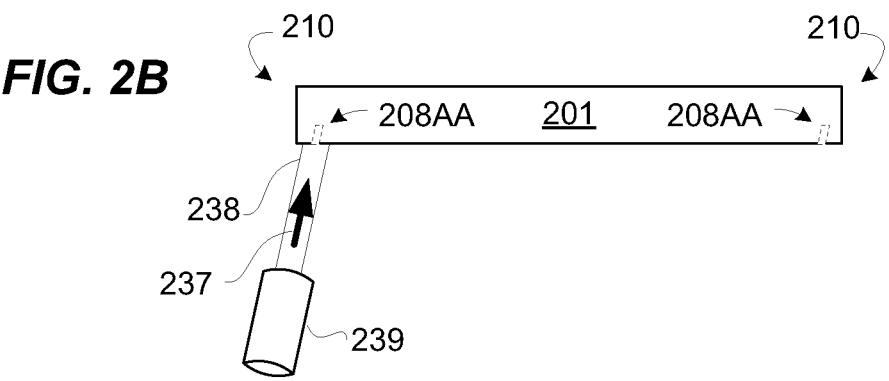
FIG. 2B is a cross-sectional view showing initial forming of a recess extending into the ceramic cover for the electronic device housing according to one embodiment.

FIG. 2B is a cross-sectional view showing initial forming of a recess extending into the ceramic cover 201 for the electronic device housing according to one embodiment. FIG. 2B is a cross-sectional view showing one or more initial recesses 208AA extending into the ceramic cover 201 for the electronic device housing. More particularly, the ceramic cover 201 may have initial laser ablated recess 208AA extending into the peripheral portion 210 of the ceramic cover 201.

As shown in FIG. 2B, a fluid jet 238 such as a jet of water 238 may be directed to contact the ceramic cover 201 at an initial oblique angle. A laser beam 237 from a laser 239 may be directed within the fluid jet 238 to contact the ceramic cover 201 at the initial oblique angle. The laser beam 237 may laser ablate the initial laser ablated recess 208AA extending into the ceramic cover 201.

Figure 2C:
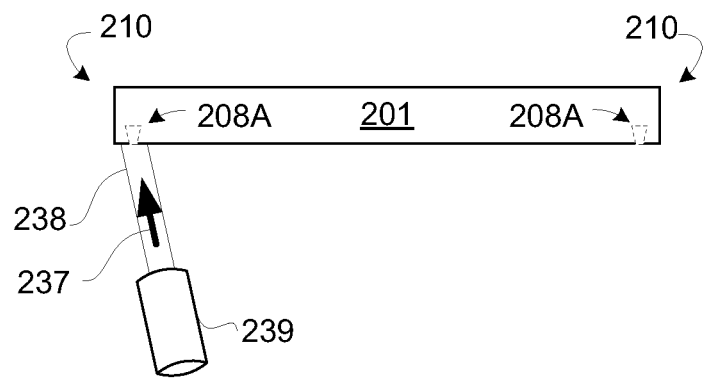
FIG. 2C is a cross-sectional view showing further forming of a recess extending into a ceramic cover for the electronic device housing according to one embodiment.

FIG. 2C is a cross-sectional view showing further forming of the recess, so as to provide dovetail recess 208A extending into the ceramic cover 201 for the electronic device housing according to one embodiment. FIG. 2C is a cross-sectional view showing one or more initial dovetail recesses 208A extending into the ceramic cover 201 for the electronic device housing. More particularly, the ceramic cover 201 may have laser ablated dovetail recess 208A extending into the peripheral portion 210 of the ceramic cover 201.

As shown in FIG. 2C, fluid jet 138 may be directed to contact the ceramic cover 201 at an opposite oblique angle, which may be opposite relative to the initial oblique angle as just discussed with respect to FIG. 2B. The laser beam 237 from the laser 139 may be directed within the fluid jet 238 to contact the ceramic cover 201 at the opposite oblique angle. The laser beam 137 may laser ablate the dovetail recess 208A extending into the ceramic cover 201.

Figure 2D:
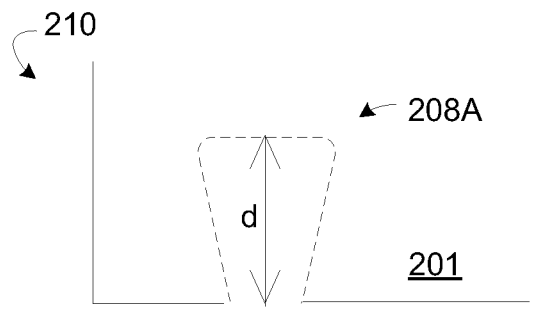
FIG. 2D is a detailed partial cross-sectional view of the recess shown in FIG. 2C.

FIG. 2D is a detailed partial cross-sectional view of the laser ablated dovetail recess 208A shown in FIG. 2C. The laser ablated dovetail recess 208A shown in detail in FIG. 2D may extend into the peripheral portion 210 of the ceramic cover 201 a depth "d" of about 0.3 millimeter. In selecting depth, there may be some compromise between a desire for increasing depth so as to provide increasing strength of the attachment member, and deceasing depth so as to provide for decreasing time spent on laser ablation.

Figure 2E:
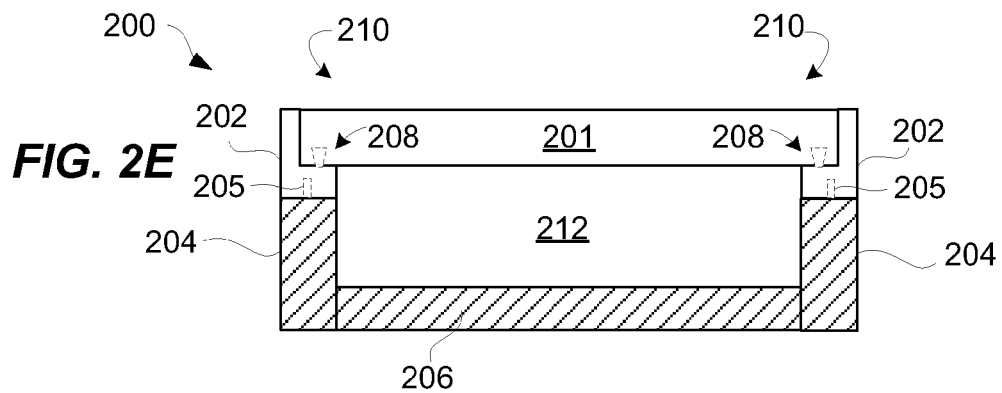
FIG. 2E is a cross-sectional view of an electronic device housing according to one embodiment.

FIG. 2E is a cross-sectional view of an electronic device housing 200 (or electronic device enclosure) according to one embodiment. The electronic device housing 200 may include an outer housing member 201, which may comprise ceramic cover 201, supported and protected by a protective side member 202, which may comprise peripheral structure 202. The ceramic cover 201, or more generally the outer housing member 201, may provide a top surface for the electronic device enclosure 200. Peripheral structure 202 may provide a support surface for the ceramic cover 201 and may provide side protective surfaces for the ceramic cover 201.

As shown in FIG. 2E, the peripheral structure 202 may be at least partially secured to the ceramic cover 201 by an attachment member 208B. The attachment member 208B may comprise an angled tenon that extends into a dovetail recess 208A of the peripheral portion 210 of the ceramic cover 201. The angled tenon may extend at generally opposite angles with respect to each other into the dovetail recess 208A of the peripheral portion 210 of the ceramic cover 201. The dovetail recess 208A may be configured to interlock mechanically with the angled tenon, so as to provide secure attachment for the attachment member 208B. Moreover, the dovetail recess 208A may be configured to interlock mechanically with the attachment member 208B (e.g., angled tenon), so as to securely attach the peripheral portion 210 of the ceramic cover 201 to the peripheral structure 202.

The attachment member 208B may be made integral with a portion of the peripheral structure 202. The attachment member 208B may be molded into the peripheral portion 210 of the ceramic cover 201. More particularly, the attachment member 208B may be molded into the dovetail recess 208A of the peripheral portion 210 of the ceramic cover 201. An internal space 212 is provided internal to the electronic device housing 200 whereby various electrical components can be attached, affixed or placed so as to provide electronic operations for the electronic device. The peripheral structure may comprise polymer, so as to facilitate molding.

The electronic device enclosure 200 may further comprise support structure 204, which may be a metal support structure. As shown in FIG. 2E, the peripheral structure 202 may be formed adjacent to the metal support structure 204. The support structure 204 may have at least one feature 205 that may provide a mechanical interlock with the peripheral structure 202 after the peripheral structure 202 has been molded.

Figure 2F:
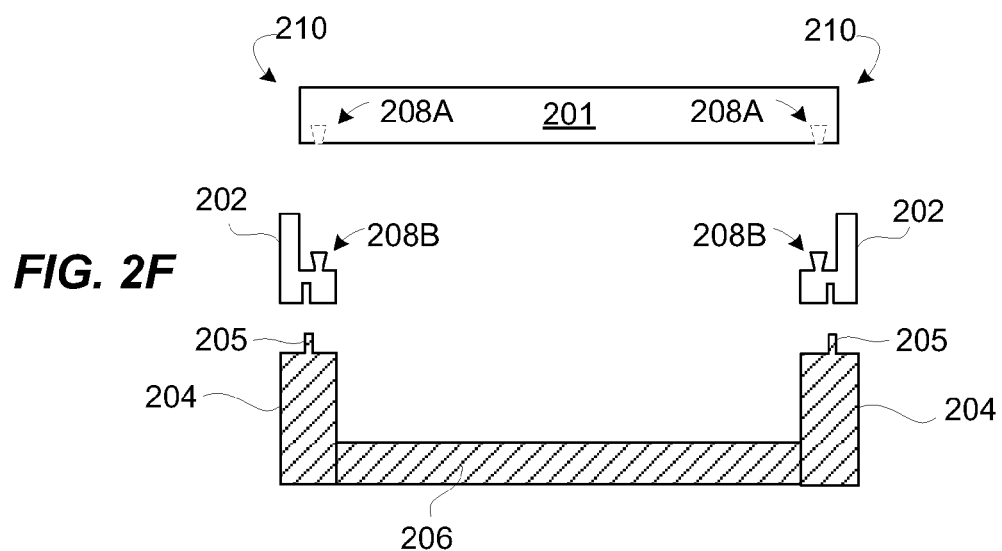
FIG. 2F is a cross-sectional assembly diagram for the electronic device housing shown in FIG. 2E, according to one embodiment.

FIG. 2F is a cross-sectional assembly diagram for the electronic device housing 200 shown in FIG. 2E, according to one embodiment. FIG. 2F particularly shows the peripheral structure 202 having the dovetail recess 208A and the attachment member 208B (e.g., angled tenon). The outer housing member 201, which may comprise ceramic cover 201, may have an outer surface and an inner surface. The inner surface of the ceramic cover 201 may be coupled with the peripheral structure 202. More particularly, the peripheral portion 210 of the ceramic cover 201 may be coupled with the peripheral structure 202 via the attachment member 208B and the dovetail recess 208A.

The attachment member 208B may extend into the dovetail recess 208A of the peripheral portion 210 of the ceramic cover 201, as shown in FIG. 2F. The dovetail recess 208A may be configured to interlock mechanically with the angled tenon serving as the attachment member 208B, so as to secure the peripheral portion 210 of the ceramic cover 201 to the peripheral structure 202.

As shown in FIG. 2F, the attachment member 208B may be made integral with a portion of the peripheral structure 202. The attachment member 208B may be molded to the peripheral portion 210 of the ceramic cover 201. More particularly, the angled tenon serving as the attachment member 208B may be molded into the dovetail recess 208A of the peripheral portion 210 of the ceramic cover 201.

Figure 2G:
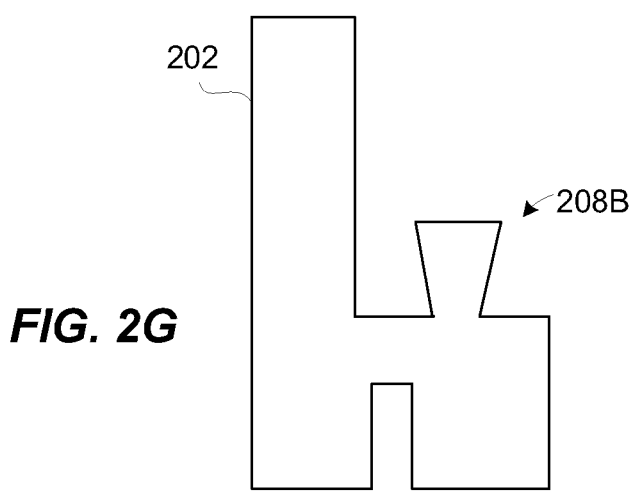
FIG. 2G is a detailed partial cross-sectional view showing a peripheral structure housing shown in FIG. 2F.

FIG. 2G is a detailed partial cross-sectional view showing the peripheral structure 202 having the angled tenon for the attachment member 208B, such as shown in FIG. 2F. The angled tenon may be part of or formed integral with a portion of the peripheral structure 202. As shown in FIG. 2G, the angled tenon serving as the attachment member 208B may extend at generally opposite angles with respect to each other for engaging the dovetail recess 208A of the ceramic cover.

Figure 3:
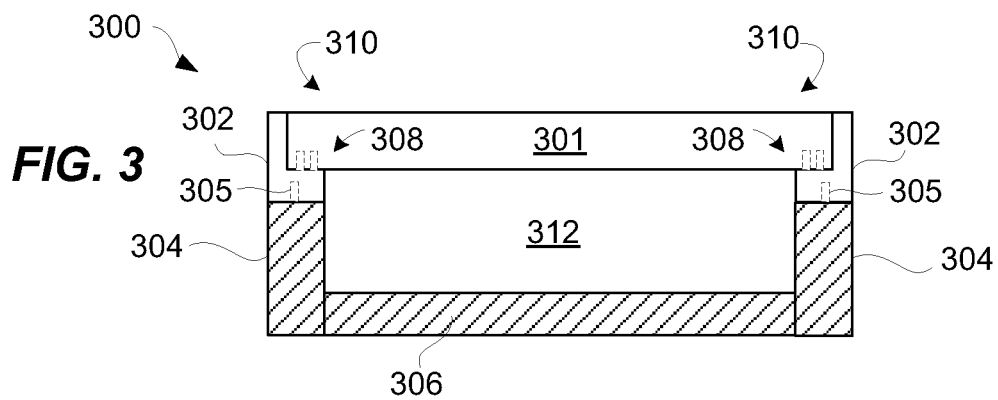
FIG. 3 is cross-sectional view of an electronic device housing according to another embodiment.

FIG. 3 is a cross-sectional view of an electronic device housing 300 (electronic device enclosure) according to one embodiment. The electronic device housing 300 may include an outer housing member 301, which may comprise ceramic cover 301, supported and protected by a protective side member 302, which may comprise peripheral structure 302. The electronic device housing 300 can employ a plurality of tenons for an attachment member 308 engaging a plurality of recesses extending into an inner surface of the ceramic cover 301.

The outer housing member 301, which may comprise ceramic cover 301, may have an outer surface in addition to the inner surface. The ceramic cover 301, or more generally the outer housing member 301, may provide an outer surface for the electronic device enclosure 300. The inner surface of the ceramic cover 301 may be coupled with the peripheral structure 302. More particularly, the peripheral portion 310 of the ceramic cover 301 may be coupled with the peripheral structure 302 via the attachment member 308. Peripheral structure 302 may provide a support surface for the ceramic cover 301 and may provide side protective surfaces for the ceramic cover 301.

As shown in FIG. 3, the peripheral structure 302 may be at least partially secured to the ceramic cover 301 by the attachment member 308. The attachment member 308 may comprise the plurality of tenons extending into the plurality of recesses of the peripheral portion 310 of the ceramic cover 301. The plurality of recesses may be configured to interlock mechanically with the plurality of tenons, so as to provide secure attachment of the ceramic cover 301 to the peripheral structure 302. Moreover, the plurality of recesses may be configured to interlock mechanically with the plurality of tenons of the attachment member 308, so as to securely attach the peripheral portion 310 of the ceramic cover 301 to the peripheral structure 302.

The plurality of tenons of the attachment member 308 may be made integral with a portion of the peripheral structure 302. The attachment member 308 may be molded to the peripheral portion 310 of the ceramic cover 301. More particularly, the plurality of tenons of the attachment member 308 may be molded into the plurality of recesses of the peripheral portion 310 of the ceramic cover 301. An internal space 312 is provided internal to the electronic device housing 300 whereby various electrical components can be attached, affixed or placed so as to provide electronic operations for the electronic device. The peripheral structure may comprise polymer, so as to facilitate molding.

The electronic device enclosure 300 may further comprise support structure 304, which may be a metal support structure. As shown in FIG. 3, the peripheral structure 302 may be formed adjacent to the support structure 304. The support structure 304 may have at least one feature 305 that may provide a mechanical interlock with the peripheral structure 302 after the peripheral structure 302 has been molded.

Figure 4:
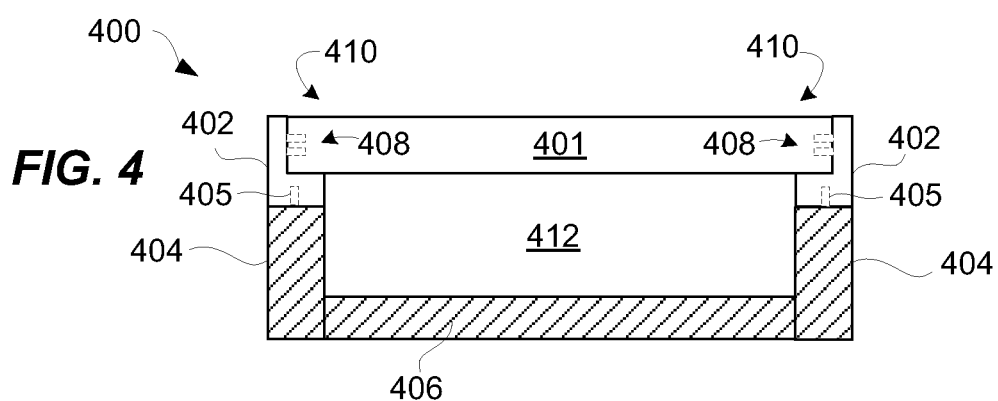
FIG. 4 is cross-sectional view of an electronic device housing according to still another embodiment.

FIG. 4 is a cross-sectional view of an electronic device housing 400 (electronic device housing) according to one embodiment. The electronic device housing 400 may include an outer housing member 401, which may comprise ceramic cover 401, supported and protected by a protective side member 402, which may comprise peripheral structure 402. The electronic device housing 300 can employ one or more of tenons for attachment member 408 engaging one or more recesses extending into a side surface of the ceramic cover 401.

The outer housing member 401, which may comprise ceramic cover 401, may have an outer surface in addition to the side surface. The ceramic cover 401, or more generally the outer housing member 401, may provide an outer surface for the electronic device enclosure 400. The side surface of the ceramic cover 401 may be coupled with the peripheral structure 402 via the attachment member 408. The peripheral structure 402 may provide a support surface for the ceramic cover 401 and may provide side protective surfaces for the ceramic cover 401.

As shown in FIG. 4, the peripheral structure 402 may be at least partially secured to the ceramic cover 401 by the attachment member 408. The attachment member 408 may comprises a plurality of tenons extending into a plurality of recesses of the peripheral portion 410 of the ceramic cover 401. The plurality of recesses may be configured to interlock mechanically with the plurality of tenons, so as to provide secure attachment of the ceramic cover 401 and the peripheral structure 402. Moreover, the plurality of recesses may be configured to interlock mechanically with the plurality of tenons of the attachment member 408, so as to securely attach the peripheral portion 410 of the ceramic cover 401 to the peripheral structure 402.

The plurality of tenons of the attachment member 408 may be made integral with a portion of the peripheral structure 402. The attachment member 408 may be molded to the peripheral portion 410 of the ceramic cover 401. More particularly, the plurality of tenons of the attachment member 408 may be molded into the plurality of recesses of the peripheral portion 410 of the ceramic cover 401. An internal space 412 is provided internal to the electronic device housing 400 whereby various electrical components can be attached, affixed or placed so as to provide electronic operations for the electronic device. The peripheral structure may comprise polymer, so as to facilitate molding.

The electronic device enclosure 400 may further comprise support structure 404, which may be a metal support structure. As shown in FIG. 4, the peripheral structure 402 may be formed adjacent to the support structure 404. The support structure 404 may have at least one feature 405 that may provide a mechanical interlock with the peripheral structure 402 after the peripheral structure 402 has been molded.

Figure 5:
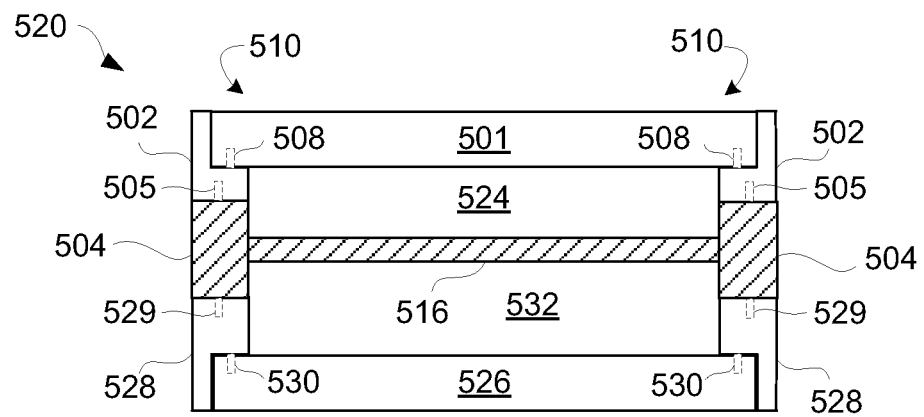
FIG. 5 is cross-sectional view of an electronic device housing according to yet another embodiment.

FIG. 5 is a cross-sectional view of an electronic device housing 520 according to one embodiment. The electronic device housing 520 can include a first outer housing member 501, which may comprise first ceramic cover 501, supported and protected by a first protective side member 502. A first protective side member 502 may be positioned tightly adjacent sides of the first outer housing member 501. The first protective side member 502 may also support the first outer housing member 501 and may serve to secure the first outer housing member 501 to other portions of the electronic device housing 520. In this embodiment, the first protective side member 502 may be secured to not only the first outer housing member 501 but also a support structure 504. In addition, in this embodiment, one or more securing features 505 can be provided on an upper surface of housing structure 504. The support structure 504 may be an outer periphery member for the electronic device housing 520.

The first protective side member 502 can be secured tightly adjacent the sides of the outer housing member 501 with the assistance of a first attachment member 508. The first attachment member 508 may comprise a first tenon extending into a first recess of peripheral portion 510 of the first ceramic cover 501. The first recess may be configured to interlock mechanically with the first tenon, so as to provide secure attachment therebetween. Moreover, the first recess may be configured to interlock mechanically with the first tenon of the attachment member 508, so as to securely attach the peripheral portion 510 of the first ceramic cover 501 to the first peripheral structure 502.

The first protective side member 502 can also be molded in place so as to be tightly adjacent the sides of the first outer housing member 501. By molding the first protective side member 502 in place, the outer exposed interface 510 between the sides (e.g., edges) of the outer housing member 501 and the peripheral side member 502 is essentially gap-free.

The first tenon of the first attachment member 508 may be made integral with a portion of the first peripheral structure 502. The first attachment member 508 may be molded to the peripheral portion 510 of the first ceramic cover 501. More particularly, the first tenon of first attachment member 508 may be molded into the first recess of the peripheral portion 510 of the first ceramic cover 501. The peripheral structure may comprise polymer, so as to facilitate molding.

The electronic device housing 520 can also include an internal structure 516 that is integral with or secured to the support structure 504. In one embodiment, the internal structure 516 can be secured to an inner surface of the support structure 504 such that it is offset from front and back planar boundaries of the support structure 504 (which may be an outer periphery member). As shown in FIG. 5, the internal structure 516 can be secured at the mid-point of the height of the support structure 504. A first internal space 524 may be provided internal to the electronic device housing 520 whereby various electrical components can be attached, affixed or placed so as to provide electronic operations for the electronic device.

In this embodiment, the electronic device housing 520 can also include similar structures on an opposite side of the electronic device housing 520. Namely, the electronic device housing 520 can further include a second outer housing member 526, which may comprise a second ceramic cover 526, supported and protected by a second protective side member 528. The second protective side member 528 can be positioned tightly adjacent sides of the second outer housing member 526. The second protective side member 528 may also support the second outer housing member 526 and may serve to secure the second outer housing member 526 to other portions of the electronic device housing 520. In this embodiment, the second protective side member 528 may be secured to not only the second outer housing member 526 but also the support structure 504. In addition, in this embodiment, one or more securing features 529 can be provided on a bottom surface of the housing structure 504. The securing features 529 can be integral with the housing structure 504. As previously noted, the support structure 504 may be an outer periphery member for the electronic device housing 520. In this embodiment, the second protective side member 528 can be secured to the support structure.

The second protective side member 528 can be secured tightly adjacent the sides of the second outer housing member 526 with the assistance of a second attachment member 530. The second attachment member 530 may comprise a second tenon extending into a second recess of a peripheral portion of the second ceramic cover 526. The second recess may be configured to interlock mechanically with the second tenon, so as to provide secure attachment therebetween. Moreover, the second recess may be configured to interlock mechanically with the second tenon of the second attachment member 530, so as to securely attach the peripheral portion of the second ceramic cover 526 to the second peripheral structure 528.

As already mentioned, first internal space 524 may be provided internal to the electronic device housing 520 whereby various electrical components can be attached, affixed or placed so as to provide electronic operations for the electronic device. Further, a second internal space 532 may be provided internal to the electronic device housing 520 (between the internal structure 516 and the second outer housing member 526) whereby various electrical components can be attached, affixed or placed so as to provide electronic operations for the electronic device. The second internal space 532 can be separate from or joined with the first internal space 524.

In one embodiment, the first outer housing member 501 can represent a top outer surface for the portable electronic device, and the second outer surface housing 526 can represent a bottom outer surface housing. In one embodiment, one or both the first outer housing member 501 and the second outer housing member 526 are ceramic (e.g., ceramic covers).

Figure 6A:
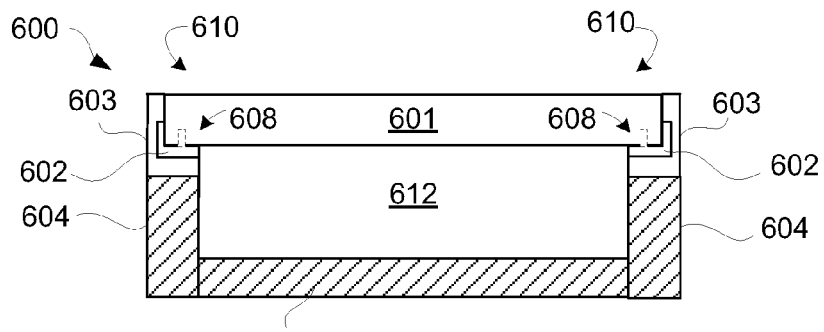
FIG. 6A is a cross-sectional view of an electronic device housing according to another embodiment.

FIG. 6A is a cross-sectional view of an electronic device housing 600 according to another embodiment. The electronic device housing 600 includes an outer housing member 601 supported and protected by an inner protective side member 602 and an outer protective side member 603. The inner protective side member 602 may be positioned tightly adjacent sides of the outer housing member 601.

The inner protective side member 602 can provide a thin layer of material positioned tightly adjacent sides of the outer housing member 601, thereby buffering impact at the sides of the outer housing member 601. The outer protective side member 603 may be positioned tightly adjacent the sides of the inner protective side member 602 as well as the sides of the outer housing member 601. The outer and inner protective side members 602, 603 can individually or in combination provide a thin layer of material positioned tightly adjacent sides of the outer housing member 601, thereby buffering impact at the sides of the outer housing member 601. One or both of the inner and outer protective side members 602, 603 can also support the outer housing member 601 and serve to secure the outer housing member 601, which may comprise ceramic cover 601, to other portions of the electronic device housing 600.

As shown in FIG. 6A, the outer housing member 601 can be secured to a support structure 604 of the electronic device housing 600. The support structure 604 can, for example, be an outer periphery member for the electronic device housing 600. In one embodiment, the support structure 604 can couple to another outer housing member 606, which can be formed differently than the outer housing member 601.

The inner protective side member 602 can be secured tightly adjacent the sides of the outer housing member 601, which may comprise ceramic cover 601, using an attachment member 608. The attachment member 608 may comprise a tenon extending into a recess in the peripheral portion 610 of the ceramic cover 601. The recess may be configured to interlock mechanically with the tenon, so as to provide secure attachment. Moreover, the recess may be configured to interlock mechanically with the tenon of the attachment member 608, so as to securely attach the peripheral portion 610 of the ceramic cover 601 to the inner protective side member 602.

The tenon of the attachment member 608 may be made integral with a portion of the inner protective side member 602. The attachment member 608 may be molded to the peripheral portion 610 of the ceramic cover 601. More particularly, the tenon of the attachment member 608 may be molded into the recess of the peripheral portion 610 of the ceramic cover 601. The inner protective side member 602 may comprise polymer, so as to facilitate molding.

The attachment member 608 can thus serve to secure the inner protective side member 602 against the sides of the outer housing member 601. The outer protective side member 603 can be molded in place around at least a portion of the inner protective side member 602 as adjacent at least to a portion of the sides of the outer housing member 601 so as to be tightly adjacent the sides of the outer housing member 601. By molding the outer protective side member 603 in place, the outer exposed interface 610 between the sides (e.g., edges) of the outer housing member 601 and the outer peripheral side member 603 can be essentially gap-free. During the molding, the outer protective side member 602 can be chemically bonded to at least a portion of the inner protective side member 602. The outer protective side member 603 may comprise polymer, so as to facilitate molding. An internal space 612 may be provided internal to the electronic device housing 600 whereby various electrical components can be attached, affixed or placed so as to provide electronic operations for the electronic device.

Figure 6B:
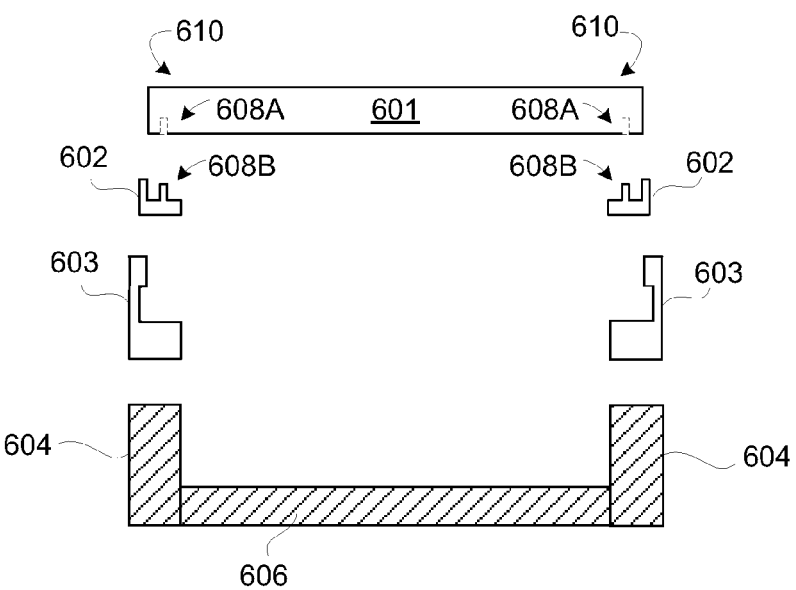
FIG. 6B is a cross-sectional assembly diagram for the electronic device housing shown in FIG. 6A, according to one embodiment.

FIG. 6B is a cross-sectional assembly diagram for the electronic device housing 600 shown in FIG. 6A, according to one embodiment. The outer housing member 601 has a top surface and a bottom surface. The bottom surface of the ceramic cover 601 may be coupled with the inner protective side member 602 via an attachment member 608B. More particularly, the peripheral portion 610 of the ceramic cover 601 may be coupled with the inner protective side member 602 via the attachment member 608B. As shown in FIG. 6B, the attachment member 608B may comprise a tenon extending into a recess 608A of the peripheral portion 610 of the ceramic cover 601. The recess 608A may be configured to interlock mechanically with the tenon, so as to provide secure attachment for the attachment member 608B. Moreover, the recess 608A may be configured to interlock mechanically with the tenon of the attachment member 608B, so as to securely attach the peripheral portion 610 of the ceramic cover 601 to the inner protective side member 602.

As shown in FIG. 6B, the tenon of the attachment member 608B may be made integral with a portion of the inner protective side member 602. The attachment member 608B may be molded to the peripheral portion 610 of the ceramic cover 601. More particularly, the tenon of the attachment member 608B may be molded into the recess 608A of the peripheral portion 610 of the ceramic cover 601. As already mentioned previously, the inner peripheral side member 602 may comprise polymer, so as to facilitate molding.

As shown in FIG. 6B, the inner protective side member 602 can then be secured adjacent the sides of the outer housing member 601. More particularly, the outer protective side member 603 can be secured to the inner protective side member 602. The outer protective side member 603 can be molded adjacent at least a portion of the sides of the outer housing member 601 and adjacent or over one or more sides of the inner protective side member 602. The outer peripheral side member 602 may comprise polymer, so as to facilitate molding. The molding process can also lead to chemical bonding of the outer protective side member 603 and the inner protective side member 602.

Moreover, when the outer protective side member 603 is formed, the outer protective side member 603 can also be adjacent and secured to an upper side portion of the support structure 604, as shown in FIG. 6B. When the outer protective side member 603 is provided at the sides (i.e., edges) of the outer housing member 601, the outer protective side member 603 (alone or in combination with the inner protective side member 602) provides a buffer layer (e.g., bumper) that dampens impact induced at the sides of the outer housing member 601 of the electronic device housing 600.

Figure 6C:
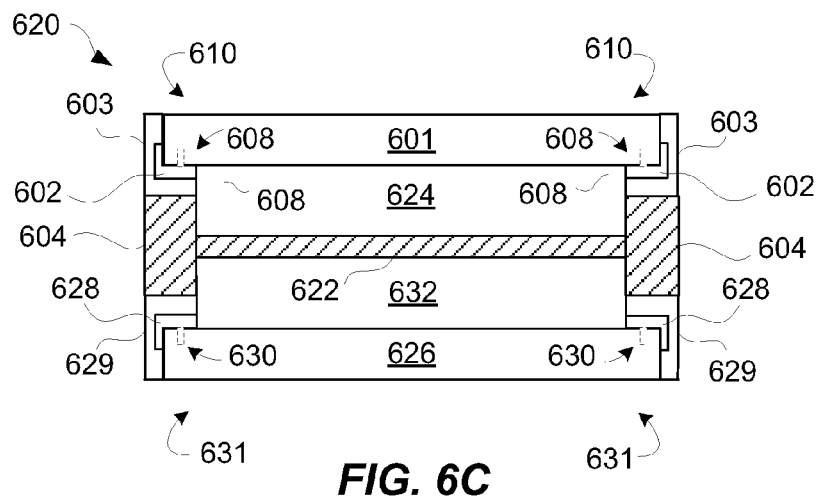
FIG. 6C is a cross-sectional view of an electronic device housing according to one embodiment.

FIG. 6C is a cross-sectional view of an electronic device housing 620 according to one embodiment. The electronic device housing 620 includes a first outer housing member 601, which may comprise first ceramic cover 601, supported and protected by a first inner protective side member 602 and a first outer protective side member 603. The first inner protective side member 602 is positioned tightly adjacent sides of the first outer housing member 601. The outer protective side member 603 may be positioned tightly adjacent the sides of the first inner protective side member 602 as well as the sides of the first outer housing member 601. The first outer and inner protective side members 602, 603 can individually or in combination provide a thin layer of material positioned tightly adjacent sides of the first outer housing member 601, thereby buffering impact at the sides of the first outer housing member 601.

One or both of the first inner and outer protective side members 602, 603 can also support the first outer housing member 601 and may serve to secure the first outer housing member 601 to other portions of the electronic device housing 620. In one embodiment, the first outer protective side member 603 (and possibly also the first inner protective side member 602) extends around all sides of the first outer housing member 601. In another embodiment, the first outer protective side member 603 (and possibly also the first inner protective side member 602) extends around those of the sides of the first outer housing member 601 that would otherwise be exposed.

The first inner protective side member 602 can be secured tightly adjacent the sides of the first outer housing member 601 using a first attachment member 608. The first attachment member 608 may comprise a first tenon, which may be formed integral with inner protective side member 602. The first tenon of the first attachment member 608 may be disposed within a first recess extending into a peripheral portion 610 of ceramic cover 601. The attachment member 608 can thus serve to secure the first inner protective side member 602 against the sides of the first outer housing member 601. The first outer protective side member 603 can be molded in place around at least a portion of the first inner protective side member 602 as adjacent at least a portion of the sides of the first outer housing member 601 so as to be tightly adjacent the sides of the outer housing member 601. By molding the first outer protective side member 603 in place, the outer exposed interface 610 between the sides (e.g., edges) of the first outer housing member 601 and the first outer peripheral side member 603 can be essentially gap-free. During the molding, the first outer protective side member 603 can be chemically bonded to at least a portion of the first inner protective side member 602.

The electronic device housing 620 can also include an internal structure 622 that is integral with or secured to the support structure 604. In one embodiment, the internal structure 622 can be secured to an inner surface of the support structure 604 such that it is offset from front and back planar boundaries of the support structure 604 (which may be an outer periphery member). As shown in FIG. 6C, the internal structure 622 can be secured at the mid-point of the height of the support structure 604. A first internal space 624 is provided internal to the electronic device housing 620 whereby various electrical components can be attached, affixed or placed so as to provide electronic operations for the electronic device.

In this embodiment, the electronic device housing 620 can also include similar structures on an opposite side of the electronic device housing 620. Namely, the electronic device housing 620 can further include a second outer housing member 626 supported and protected by a second inner protective side member 628 and a second outer protective side member 629. The second inner protective side member 628 can be positioned tightly adjacent sides of the second outer housing member 626. The second outer protective side member 629 can be positioned tightly adjacent the sides of the inner protective side member 628 as well as the sides of the second outer housing member 626. The second outer and inner protective side members 628, 629 can individually or in combination provide a thin layer of material positioned tightly adjacent sides of the second outer housing member 626, thereby buffering impact at the sides of the second outer housing member 626.

One or both of the second inner and outer protective side members 628, 629 can also support the second outer housing member 626 and serve to secure the second outer housing member 626 to other portions of the electronic device housing 620. In one embodiment, the second outer protective side member 629 (and possibly also the inner protective side member 628) extends around all sides of the second outer housing member 626. In another embodiment, the second outer protective side member 629 (and possibly also the second inner protective side member 628) extends around those of the sides of the second outer housing member 626 that would otherwise be exposed.

The second inner protective side member 628 can be secured tightly adjacent the sides of the second outer housing member 626 using a second attachment member 630. The second attachment member 630 may comprise a second tenon, which may be formed integral with second inner protective side member 628. The second tenon of the second attachment member 630 may be disposed within a second recess extending into a peripheral portion of the second ceramic cover 626.

The attachment member 630 can thus serve to secure the second inner protective side member 628 against the sides of the second outer housing member 626. The second outer protective side member 629 can be molded in place around at least a portion of the second inner protective side member 628 and adjacent to at least a portion of the sides of the second outer housing member 626 so as to be tightly adjacent the sides of the second outer housing member 626. By molding the second outer protective side member 629 in place, the outer exposed interface 631 between the sides (e.g., edges) of the second outer housing member 626 and the second outer peripheral side member 629 can be essentially gap-free. During the molding, the second outer protective side member 629 can be chemically bonded to at least a portion of the second inner protective side member 628.

As already mentioned, first internal space 624 may be provided internal to the electronic device housing 600 whereby various electrical components can be attached, affixed or placed so as to provide electronic operations for the electronic device. Further, a second internal space 632 is provided internal to the electronic device housing 620 (between the internal structure 622 and the second outer housing member 626) whereby various electrical components can be attached, affixed or placed so as to provide electronic operations for the electronic device. The second internal space 632 can be separate from or joined with the first internal space 624.

In one embodiment, the first outer housing member 601 can represent a top outer surface for the portable electronic device, and the second outer surface housing 626 can represent a bottom outer surface housing. In one embodiment, both the first outer housing member 601 and the second outer housing member 626 are ceramic (e.g., ceramic covers).

Figure 7:
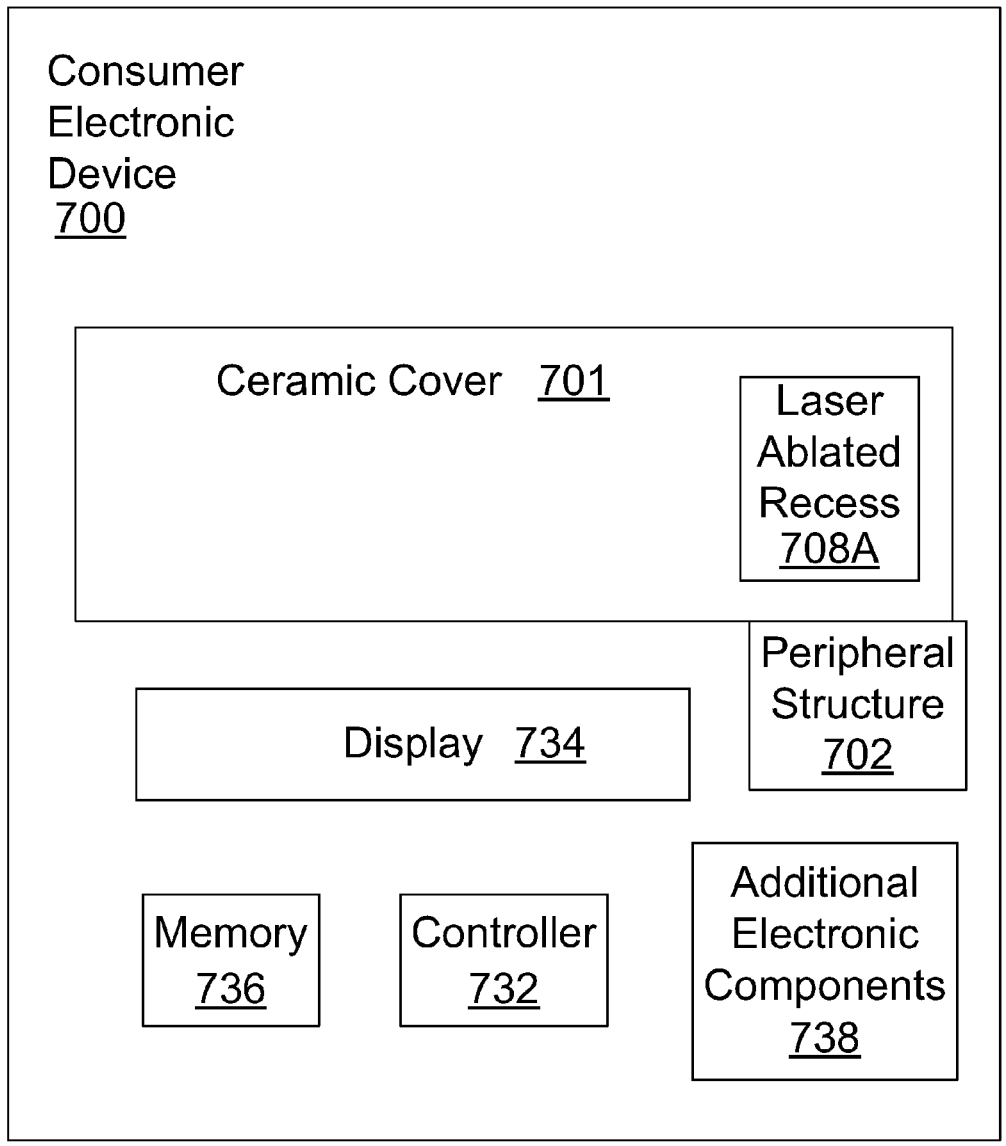
FIG. 7 shows a block diagram of a consumer electronic device according to one embodiment.

FIG. 7 shows a block diagram of a consumer electronic device 700 according to one embodiment. The consumer electronic device 700 may comprise a ceramic cover 701 for a top surface for the consumer electronic device 700. The ceramic cover 701 may comprises at least one of sapphire and zirconia. The ceramic cover 701 may have a laser ablated recess 708A extending into the ceramic cover 701.

The consumer electronic device 700 may further comprise a peripheral structure 702 for providing a support surface for the ceramic cover 701 and for providing side protective surfaces for the ceramic cover 701. The peripheral structure 702 may be at least partially secured to the ceramic cover 701.

The consumer electronic device 700 may further comprise electrical components, which may include at least a controller 732. Controller 732 may be coupled with a memory 736 and a display 734. The display may be provided at or adjacent the top surface for the consumer electronic device 700. The ceramic cover 701 may be provided over the display 734.

The consumer electronic device 700 may be one of a media player, a media storage device, a portable digital assistant, a tablet personal computer, a computer, a mobile phone (e.g., cellular phone), a smart phone, a global positioning system unit, and a remote control. At least a portion of functionality for the foregoing may be provided by the controller 732 being coupled with suitable additional electronic components 738.

Figure 8:
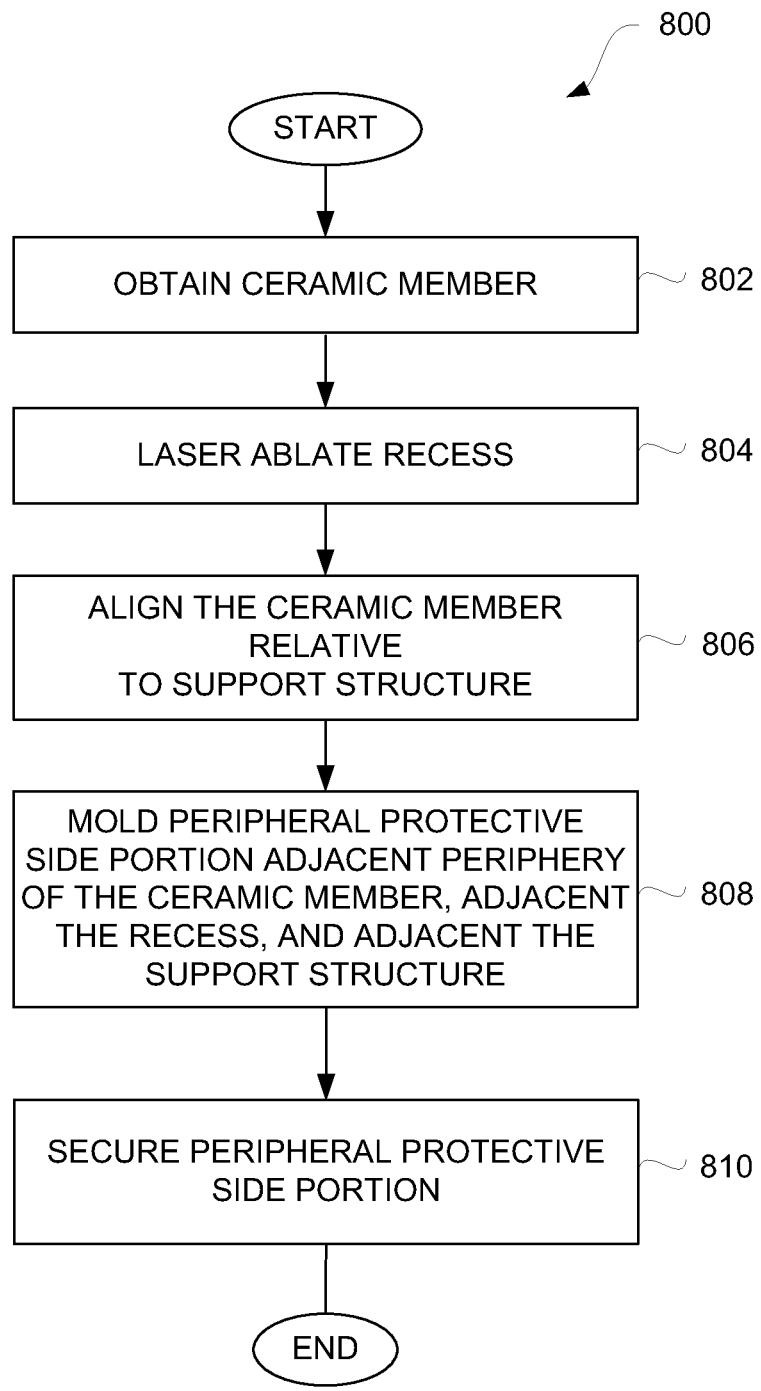
FIG. 8 is a flow diagram of a housing formation process according to one embodiment.

FIG. 8 is a flow diagram of a housing formation process 800 according to one embodiment of the invention. The housing formation process 800 can operate to produce a housing for an electronic device, or at least a portion of such a housing.

The housing formation process 800 can initially obtain 802 a ceramic member. The ceramic member can have a top surface and a bottom surface, wherein the top surface may provide an outer surface for substantially all of a surface of the electronic device. More generally, the ceramic member may serve as a significant outer surface for the housing. For example, the ceramic member can correspond to a top surface for the housing. Alternatively or additionally, the ceramic member can correspond to a bottom surface for the housing.

The ceramic member is typically thin, particularly when used with portable electronic devices. In one embodiment, the ceramic member has a thickness of less than 5 mm, or more particularly less than 1 mm. The ceramic member may comprise a relatively hard ceramic such as sapphire or zirconia. The ceramic member may be substantially transparent, and may provide a ceramic window, so that a display of electronic device may be viewable through the ceramic window. The ceramic member may have an at least partly crystalline structure. The ceramic member may have a substantially crystalline structure. A majority of the ceramic member may have a crystalline structure.

After the ceramic member has been obtained 802, a recess may be laser ablated 804 into the ceramic member. A fluid jet may be directed to contact the ceramic member, and a laser beam may be directed within the fluid jet to contact the ceramic member, so as to laser ablate a recess extending into the ceramic member. In some embodiments, a plurality of recesses may be laser ablated into the ceramic member.

The recess can have any of a variety of configurations. For example, the recess can include one or more undercuts. In one embodiment, the recess can be configured as a dovetail recess. The dovetail recess may be laser ablated into the ceramic member. A laser beam may be directed to contact the ceramic member at one or more oblique angles, so as to laser ablate the dovetail recess extending into the ceramic member.

Thereafter, the ceramic member can be aligned 806 relative to a support structure. The support structure can be provided as being a component of the housing for the electronic device. For example, the support can pertain to a side structure for the housing or an interior support member. As an example, the support structure may comprise metal.

After the ceramic member has been aligned 806 with the support structure, a peripheral protective side portion can be molded 808 adjacent the periphery of the ceramic member and/or adjacent the recess and/or adjacent the support structure. In particular, molding 808 may comprise injecting molding material (e.g., polymer) into the recess extending into the ceramic member.

Furthermore, handling of the ceramic member for which a component (e.g., peripheral side member) is being formed around may be facilitated by using a coating during a molding process. A metal mold may normally be used in molding. However, the metal mold may otherwise introduce handling difficulties for a ceramic member during molding. To mitigate handling difficulties for the ceramic member, the metal mold (i.e., its inner surfaces) can be coated. The coating can, for example, be a thin layer of polytetrafluoroethylene (PTFE) or polyimide film.

Accordingly, it should be understood that molding 808 may comprise obtaining a metal mold having an inner surface configured to form the peripheral protective side portion for the electronic device, coating at least a portion of the inner surface of the metal mold, and/or injecting a molding material (e.g., polymer) into the metal mold to form the peripheral protective side portion for the electronic device.

The molded peripheral side portion may be secured 810 or at least partially secured to the ceramic member via an attachment member. The attachment member may comprise a tenon extending into the recess of a peripheral portion of the ceramic cover. The recess may be configured to interlock mechanically with the tenon, so as to provide secure attachment therebetween. Moreover, the recess may be configured to interlock mechanically with the tenon of the attachment member, so as to securely attach the peripheral portion of the ceramic member to the molded peripheral side portion. The attachment member may be formed as a ring or a substantial portion of a ring about the peripheral portion of the ceramic cover.

The tenon of the attachment member may be made integral with the molded peripheral side portion. More particularly, the tenon of the attachment member may be molded into the recess of the ceramic cover, as the molded peripheral side portion is molded against the ceramic cover.

Furthermore, the molded peripheral side portion may be formed adjacent to a support structure. The molded peripheral side portion may be secured to the support structure via at least one mechanical feature of the support structure. The support structure can, for example, be formed of metal.

Once the molded peripheral side portion is secured 810 to the ceramic member, the housing formation process 800 can end.

The protective side members discussed above are typically thin layers of material positioned tightly adjacent sides of the outer housing member, thereby buffering impact at the sides of the outer housing members. In one embodiment, the protective side members are to be strong; hence, a structurally strengthened polymer, such as polyarylamide, can be utilized. The polyarylamide can be strengthened by containing ceramic or glass fibers. One source of strengthened polyarylamide is IXEF polyarylamide (PARA) from Solvay Advanced Polymers, L.L.C which can contain glass fiber reinforcement.

Additionally, since the protective side members are tightly adjacent sides of the outer housing member, the respective materials used for the protective side members and the outer housing member. Specifically, the Coefficient of Thermal Expansion (CTE) of the respective materials, if not controlled, can produce undesired stress on the sides of the outer housing member. Plastics tend to have CTE's (e.g., roughly 100 millimeters/meter/° C.) that are dramatically higher than that of ceramics such as sapphire or zirconia, some manufactured polymers, such as polyarylamide, can have CTE's (e.g., roughly 30 millimeters/meter/° C.) that are substantially closer to that of sapphire or zirconia and thereby would, if used, induce less stress on the sides of the outer housing member. For example, in one embodiment, a manufactured polymer for such use could have a CTE less than or equal to about 50 millimeters/meter/° C., and in another embodiment, a manufactured polymer for such use could have a CTE less than or equal to about 35 millimeters/meter/° C. In one implementation, additive can be added to a polymer so to bring is CTE closer to that of ceramics such as sapphire or zirconia. As examples, the additives can be particles or fibers, which can be formed from glass or ceramic. Also, as noted above, the thickness of the protective side member can be thin, for example, the thickness can be on the order of about 1 mm or less in one embodiment.

In still other embodiments, the protective side materials can be formed from multiple materials that can be alternated, intertwined or layered. The later of material against the edges of the outer housing member of ceramic can have a CTE relatively close to that of ceramic such as sapphire or zirconia, while an outer layer can have a higher CTE can permit a greater range of material, such as polymers (e.g., plastics).

The protective side members are able to be thin yet be cosmetically unintrusive. For example, in some embodiments, the thickness (t1) for the protective side member can be less than 1 mm (e.g., 0.8 mm). Also, in some embodiments, the thickness (t2) of the outer housing member can be less than 5 mm (e.g., 1 mm). However, these thicknesses are exemplary and vary with the size of the electronic device housing and with desired strength. Using a strengthened material for the protective side members as noted above can also be advantageous. Nevertheless, the provisioning of thin protective side members for outer housing members, such as ceramic covers, facilitates providing portable electronic device housings that are compact and thin yet resistant to side impact damage to the outer housing members.

Additional details on side protective members for electronic device housings are contained in U.S. application Ser. No. 12/794,563, filed Jun. 4, 2010, and entitled "OFFSET CONTROL FOR ASSEMBLING AN ELECTRONIC DEVICE HOUSING," and in U.S. application Ser. No. 12/944,671, filed Nov. 11, 2010, and entitled "INSERT MOLDING AROUND GLASS MEMBERS FOR PORTABLE ELECTRONIC DEVICES" which are hereby incorporated herein by reference.

In general, the steps associated with the methods of the present invention may vary widely. Steps may be added, removed, altered, combined, and reordered without departing from the spirit or the scope of the present invention.

The various aspects, features, embodiments or implementations of the invention described above may be used alone or in various combinations.

While this specification contains many specifics, these should not be construed as limitations on the scope of the disclosure or of what may be claimed, but rather as descriptions of features specific to particular embodiment of the disclosure. Certain features that are described in the context of separate embodiments may also be implemented in combination. Conversely, various features that are described in the context of a single embodiment may also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While embodiments and applications have been shown and described, it would be apparent to those skilled in the art having the benefit of this disclosure that many more modifications than mentioned above are possible without departing from the inventive concepts herein.

The invention claimed is:

1. An electronic device enclosure, comprising:
 a unitary ceramic cover formed from a sapphire material, comprising:
  a top surface;
  a bottom surface; and
  a blind recess formed into the bottom surface and extending toward the top surface, the blind recess defined by a recessed surface and interior sidewalls extending from the recessed surface to a bottom surface of the unitary ceramic cover;
 a peripheral structure overmolded over a portion of the unitary ceramic cover and into the blind recess and that defines an attachment member secured within the blind recess along the interior sidewalls and the recessed surface; and
 an outer housing member coupled with the peripheral structure opposite the unitary ceramic cover, wherein a thickness of the unitary ceramic cover is less than 5 millimeters.

2. The electronic device enclosure as recited in claim 1, wherein the ceramic cover comprises at least one of sapphire and zirconia.

3. The electronic device enclosure as recited in claim 1, wherein the blind recess is a laser ablated recess extending into a peripheral portion of the ceramic cover.

4. The electronic device enclosure as recited in claim 1, wherein the attachment member comprises at least one tenon configured to extend into the blind recess of the ceramic cover.

5. The electronic device enclosure as recited in claim 4, wherein the tenon comprises an angled tenon, and wherein the recess comprises a dovetail recess configured to interlock mechanically with the angled tenon.

6. The electronic device enclosure as recited in claim 4, wherein the tenon of the attachment member is integral with a portion of the peripheral structure.

7. The electronic device enclosure as recited in claim 1, wherein overmolding of the peripheral structure to the ceramic cover results in a gap-free interface.

8. The electronic device enclosure as recited in claim 1, wherein the peripheral structure comprises a polymer.

9. The electronic device enclosure as recited in claim 1, wherein the peripheral structure comprises ceramic fibers.

10. The electronic device enclosure as recited in claim 1, wherein the peripheral structure and the ceramic cover have substantially similar coefficients of thermal expansion.

11. The electronic device enclosure as recited in claim 10, wherein the peripheral structure comprises additives that are configured to modify the coefficient of thermal expansion of the peripheral structure, the additives including particles or fibers made of a ceramic material.

12. The electronic device enclosure as recited in claim 1, wherein the outer housing member has at least one securement feature that mechanically interlocks with the peripheral structure, thereby coupling the peripheral structure and the outer housing member.

13. The electronic device enclosure as recited in claim 1, wherein
 the ceramic cover has a Vickers hardness that is greater than seven hundred.

14. The electronic device enclosure as recited in claim 1, wherein the blind recess extends into the ceramic cover by at least 0.3 millimeter.

15. The electronic device enclosure as recited in claim 1, wherein the ceramic cover is substantially transparent.

16. The electronic device enclosure as recited in claim 1, wherein the ceramic cover has an at least partly crystalline structure.

17. The electronic device enclosure of claim 1, wherein:
 the top surface of the unitary ceramic cover defines at least a portion of a front of the unitary ceramic cover; and
 the entire front of the unitary ceramic cover is unobstructed by the peripheral structure.

18. The electronic device enclosure of claim 17, wherein the entire front of the unitary ceramic cover is completely exposed.

19. A consumer electronic device, comprising:
 a monolithic sapphire cover defining outer and inner surfaces of the consumer electronic device and defining an exterior surface of a display, the monolithic sapphire cover having a recessed channel defined by interior sidewalls extending from the inner surface to a recessed surface that is substantially parallel to, and positioned less than 5 millimeters from, the inner surface;

a peripheral structure molded over a side surface of the monolithic ceramic cover and along the interior sidewalls and recessed surface of the recessed channel; and an outer housing member having a securement feature that mechanically interlocks with a portion of the peripheral structure.

20. The consumer electronic device as recited in claim 19, wherein:

the ceramic cover comprises at least one of sapphire and zirconia: and the consumer electronic device is one of: a media player, a media storage device, a portable digital assistant, a tablet personal computer, a computer, a mobile phone, a smart phone, a global positioning system unit, or a remote control.

21. The consumer electronic device as recited in claim 19, wherein a portion of the peripheral structure that is molded along the interior sidewalls and recessed surface defines an attachment member that couples the monolithic sapphire cover and the peripheral structure.

22. An electronic device enclosure, comprising:

a ceramic cover formed from a sapphire material and defining first and second surfaces of the electronic device enclosure, the ceramic cover having a laser-etched blind recess defined by interior sidewalls extending into the second surface by a distance of less than 5 millimeters and toward the first surface;

an overmolded peripheral structure, comprising:

a side portion overmolded over a side surface of the ceramic cover; and a tenon formed into the laser-etched blind recess and abutting the interior sidewalls to mechanically interlock the ceramic cover and the peripheral structure; and an outer housing member coupled with the peripheral structure.

23. The electronic device enclosure as recited in claim 22, wherein:

the laser-etched blind recess is a first laser-etched blind recess;

the tenon is a first tenon;

the electronic device enclosure further comprises:

a second laser-etched blind recess extending inwardly from the side surface of the ceramic cover;

a second tenon member coupled to the side portion of the peripheral section.

24. The electronic device enclosure as recited in claim 23, wherein the first and second laser-etched blind recesses are formed using laser ablation.

25. The electronic device enclosure as recited in claim 23, wherein the second tenon is formed into the second laser-etched blind recess of the ceramic cover.

26. The electronic device enclosure as recited in claim 22, wherein the laser-etched blind recess is positioned at a peripheral portion of the ceramic cover.

27. The electronic device enclosure as recited in claim 26, wherein the tenon in the recess provides a substantially gap-free interface between the peripheral structure and the ceramic cover.

28. The electronic device enclosure as recited in claim 22:

wherein the outer housing member has at least one securement feature that engages the peripheral structure.

* * * * *